July 15, 1958  H. F. STREIB  2,843,339
CIRCULAR WING AIRCRAFT HAVING SUCTION
INDUCED RADIAL AIRFLOW
Filed April 28, 1955  2 Sheets-Sheet 1

*INVENTOR.*
HOMER F. STREIB
BY
Knox & Knox
ATTORNEYS

July 15, 1958

H. F. STREIB 2,843,339

CIRCULAR WING AIRCRAFT HAVING SUCTION
INDUCED RADIAL AIRFLOW

Filed April 28, 1955

INVENTOR.
HOMER F. STREIB
BY
Knox & Knox
ATTORNEYS

United States Patent Office 2,843,339
Patented July 15, 1958

2,843,339

CIRCULAR WING AIRCRAFT HAVING SUCTION INDUCED RADIAL AIRFLOW

Homer F. Streib, Chula Vista, Calif.

Application April 28, 1955, Serial No. 504,626

10 Claims. (Cl. 244—12)

The present invention relates generally to aircraft and more particularly to a circular wing aircraft having suction induced radial airflow.

The primary object of this invention is to provide a circular wing aircraft having a downwardly thrusting ducted impeller mounted in the center of the aircraft and arranged to draw air radially inwardly across the wing surfaces, the wing being designed so that a radial cross section thereof is a true airfoil, so that the major portion of the lift is derived from the radial airflow.

Another object of this invention is to provide a circular wing aircraft in which the impeller duct has a plurality of slots therein so that air is induced to flow through the wing itself, the air entering the wing through peripheral slots which are placed so that the inward airflow is diverted partially over the outer wing surfaces and partially into the slots.

Another object of this invention is to provide a circular wing aircraft in which the impeller is mounted on a gimbal so that the airflow can be deflected in any direction to achieve lateral control.

Finally, it is an object to provide a circular wing aircraft of the aforementioned character which is simple, safe and convenient to operate, and which will fly vertically as well as in any lateral direction.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and wherein similar characters of reference indicate similar or identical elements and portions throughout the specification and throughout the views of the drawings, and in which:

Figure 1:
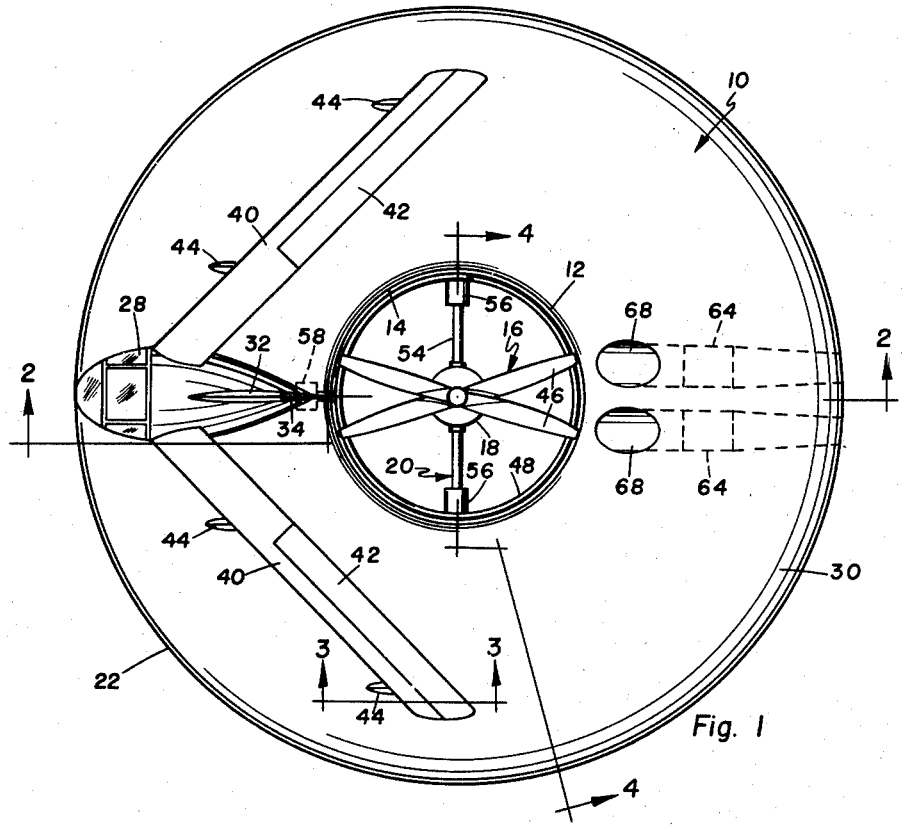
Fig. 1 is a top plan view of the aircraft.
Figure 2:
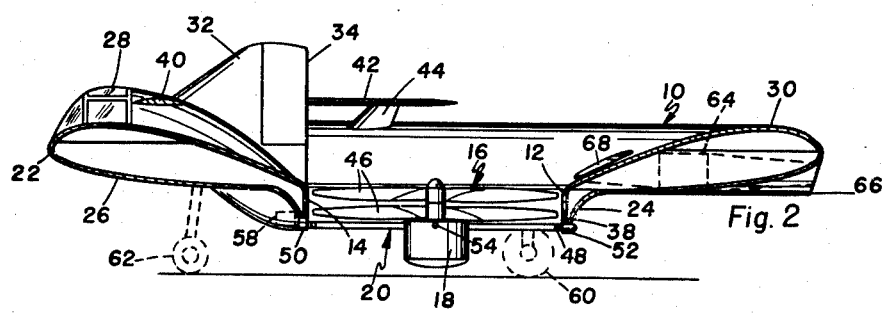
Fig. 2 is a sectional view taken on the line 2—2 of Fig. 1.
Figure 3:
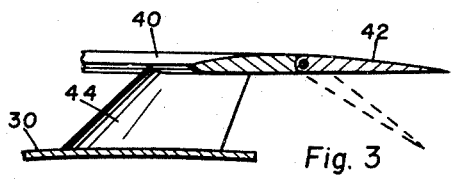
Fig. 3 is an enlarged fragmentary sectional view taken on the line 3—3 of Fig. 1.
Figure 4:
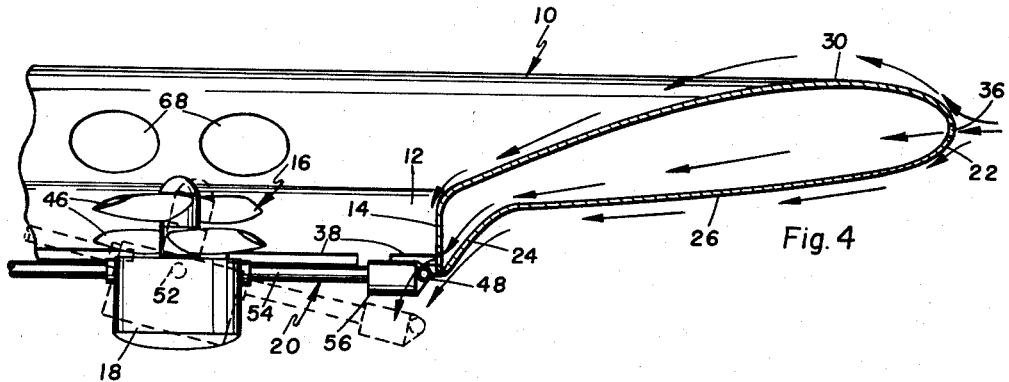
Fig. 4 is an enlarged fragmentary sectional view taken on the line 4—4 of Fig. 1.

Referring now to the drawings in detail, the aircraft is essentially a circular wing 10 having a central circular opening 12 which extends downwardly through the wing and comprises a duct 14. In the duct 14 is an impeller 16 driven by a motor 18 which is mounted on a gimbal 20 so that the impeller is tiltable within the duct. The wing 10 is designed so that any radial cross section thereof, from the periphery 22 to the duct 14, is a true airfoil, as shown in Figs. 2 and 4, although a suitable fairing 24 is fitted at the transition of the lower wing surface 26 with said duct. The outer periphery 22 actually constitutes the leading edge of the airfoil section. The forward end of the aircraft is defined by a cockpit or cabin structure 28 on the upper wing surface 30 and an upright fin 32 extending from the rear portion of said cabin, said fin having a rudder 34 pivotally mounted thereon. The periphery 22 has a plurality of elongated intake slots 36 therein to allow air to enter the interior of the wing, while the duct 14 is provided with a plurality of annular induction slots 38 adjacent the lower end thereof. Mounted on the upper surface 30 are control planes 40 on which are controllable elevons 42 coupled to suitable pilot actuated controls in the cabin 28. The control planes 40 extend outwardly and rearwardly from the cabin 28 and are supported above the wing 10 on suitable streamlined struts 44.

The impeller 16 may be of any suitable type, two-bladed propeller 46 being shown for simplicity and the propellers being contra-rotating to eliminate torque. The gimbal comprises a gimbal ring 48 which is pivotally mounted on the longitudinal of the aircraft and is supported in front and rear bearings 50 and 52, respectively, at the lower edge of the duct 14. The motor 18 is pivotally mounted on the transverse axis of the aircraft by a shaft 54 extending diametrically across the gimbal ring 48. At the junctions of the shaft 54 with the gimbal ring 48 are synchronized actuating motors 56 for pivotal movement of the motor 18 relative to said ring. Adjacent the front bearing 50 is a further actuating motor 58 operatively connected to the gimbal ring 48 for pivotal movement of the ring about the longitudinal axis. Thus the impeller 16 can be controllably tilted in any desired direction within the duct 14. The motors 56 and 58 are, of course, operated by suitable pilot's controls which can be arranged so that the changes of direction caused by tilting the impeller are instinctive as in normal aircraft control.

Figure 5:
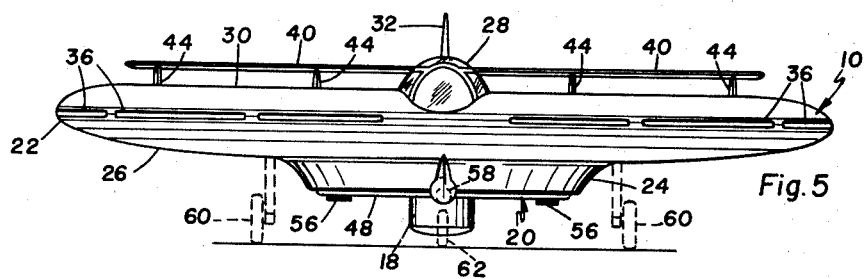
Fig. 5 is a front elevation view of the aircraft.

The aircraft may be fitted with any suitable type of landing gear, such as that shown in dash line in Figs. 2 and 5, which includes main wheels 60 and a nose wheel 62 in the well known tricycle arrangement. For high speed forward flight the aircraft may be provided with turbojet motors 64 installed in the rear portion of the wing 10 and having rearwardly extending tail pipes 66, suitable air intakes 68 being located in the upper surface 30.

In operation, the impeller 16 creates a downwardly moving airflow through the duct 14 which causes an influx of air radially across the wing 10 and into the duct. Since the actual airfoil section of the wing is in a radial direction, this airflow creates, as described in my co-pending application Serial No. 369,638, filed July 22, 1953, considerable lift. It has been found in flight tests that a very high lift is generated in this manner and the aircraft can be made to rise rapidly in vertical flight. The downward flow from the duct 14 also contributes to lift, although the static thrust of the impeller is actually insufficient to lift the weight of the aircraft, the major portion of the lift being derived from the wing itself. The impeller 16 also induces airflow from the induction slots 38 into the duct 14 by the well known effect of pressure drop at the slots. This causes air to be drawn in through the peripheral intake slots 36 and through the interior of the wing 10. Since the wing 10 is shown in its basic form with no internal structural details, no ducting is indicated for this internal airflow, but suitable ducting can be installed if necessary. The air approaching the intake slots 36 is divided at the periphery 22 and part of the flow is diverted over the upper and lower surfaces of the wing 10, as shown by the directional arrows in Fig. 4. Thus the internal airflow through the wing induces the radial airflow over the outer surfaces and greatly increases the static and low speed lift of the aircraft. The inwardly radial flow over the lower surface 26 is further assisted by the induction effect at the lower edge of the duct 14 where the radial flow merges with the downward column of air from the duct. The intake slots 36 are illustrated as simple slots cut in the periphery 20, but it will be obvious that such slots, together with the contours of the periphery itself, can be aerodynamically designed to achieve the most efficient airflow in the manner desired.

Figure 6:
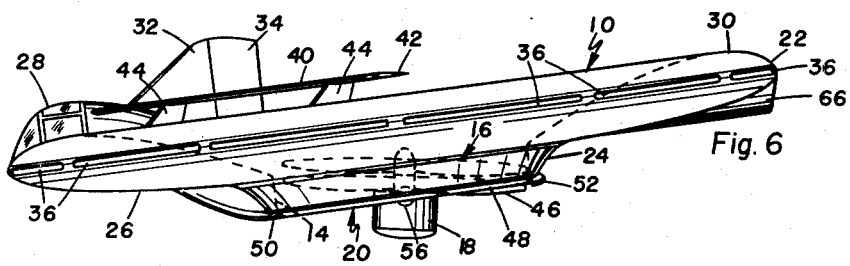
Fig. 6 is a side elevation view thereof in exaggerated forward flight attitude.

By merely controlling the rotational speed of the impeller 16, the aircraft can be made to rise, fall or hover in vertical flight. For low speed directional control the impeller 16 is also tilted in its gimbal mounting. To move the aircraft to one side, the motor 58 is actuated to tilt the motor and impeller assembly as shown in dash line in Fig. 4. Flight tests have shown that the impeller 16 actually tends to remain in its normal plane of rotation due to the gyroscope effect of the rotating propellers, while the aircraft itself tilts. This tilting causes the angle of attack of the airfoil to be increased on one side of the aircraft and decreased on the other with the result that lift is increased on one side causing the aircraft to move to the side of decreased angle of attack. In other words, the aircraft tilts slightly downwardly in the direction of motion. For low speed forward flight, the motors 56 are actuated causing the aircraft to assume a nose down attitude as in Fig. 6, which is exaggerated for illustrative purposes. Backward motion is, of course, accomplished by reversing the motors 56 to tilt the aircraft in the opposite direction.

In low speed flight, the elevons 42 may be used to counteract excess tilting of the aircraft in lateral motion without adverse effects on the unequal lift distribution which causes the lateral movement. For example, in forward flight the elevons 42 can be used together in the manner of elevators to raise the nose of the aircraft slightly, and in backward flight to lower the nose. In flight to the side the elevons 42 can be used in the manner of ailerons to raise or lower either side of the aircraft as desired. The elevons 42 are thus actually trim or compensating controls and are not used for major directional control in low speed flight. The rudder 34 is also used in low speed flight to rotate the aircraft to a desired heading. It should be noted that the rudder 34 is on the forward portion of the aircraft rather than at the rear, since in vertical or low speed flight, the radial influx of air over the rear wing portion would cause reversal of normal rudder effects.

The aircraft can achieve sufficient speed in horizontal flight to be suitable for many applications, such as commuter air traffic, short range cargo haulage and similar operations. However, the use of the turbojet motors 64 provide added thrust for reasonably high speed forward flight. In forward flight the airflow is, of course, from front to rear over the entire wing 10. While the radial airfoil section reduces the overall efficiency of the wing in such forward flight, the large wing area compensates for the loss and the lack of a fuselage and tail surfaces reduces the weight and drag of the aircraft. The relatively thick wing provides considerable internal space for cargo, fuel and the like.

The wing 10 is illustrated with its radial airfoil section at a particular angle of attack relative to the horizontal datum of the aircraft. It should be understood, however, that the angle of attack may be varied considerably according to the particular design and function of the aircraft. The entire aircraft is, of course constructed according to accepted aircraft standards.

The operation of this invention will be clearly comprehended from a consideration of the foregoing description of the mechanical details thereof, taken in connection with the drawing and the above recited objects. It will be obvious that all said objects are amply achieved by this invention. Further description would appear to be unnecessary.

It is understood that minor variation from the forms of the invention disclosed herein may be made without departure from the spirit and scope of the invention, and that the specification and drawing are to be considered as merely illustrative rather than limiting.

I claim:

1. In an aircraft: a circular wing having a central circular opening therein; the radial cross section of said wing between said opening and the outer periphery of the wing being that of an efficient, lift-producing airfoil having its leading edge at the outer periphery; a downwardly thrusting impeller operatively mounted in said opening; said wing being hollow and having slots at said periphery and at said opening and cooperating with said impeller to constitute means for inducing flow of air through said wing from said periphery to said opening to augment the mass flow therethrough and to increase the flow over said wing.

2. In an aircraft: a circular wing having a central circular opening therein; the radial cross section of said wing between said opening and the outer periphery of the wing being that of an efficient, lift-producing airfoil having its leading edge at the outer periphery; a duct extending downwardly from said opening; a downwardly thrusting impeller operatively mounted in said duct; means for tilting said impeller in two directions normal to each other; said wing being hollow and having slots spaced along said periphery, said duct also having slots communicating with the interior of said wing; said slots, with said impeller, constituting means for inducing flow of air through said wing from said periphery to said duct.

3. In an aircraft: a circular wing having a central circular opening therein; the radial cross section of said wing between said opening and the outer periphery of the wing being that of an efficient, lift-producing airfoil having its leading edge at the outer periphery; a duct extending downwardly from said opening; a downwardly thrusting impeller operatively mounted in said duct; a plurality of slots in said duct communicating with the interior of said wing and positioned to induce a pressure drop within the wing under influence of air flow through said impeller; a plurality of intake slots spaced along the outer periphery of said wing to admit air to the interior of the wing, whereby a radially inwardly airflow is induced in said wing; said intake slots and the outer periphery of said wing being dimensioned to occupy only a portion of said leading edge so that the main portion of the radially flowing air is diverted over the upper surface of the wing to provide the principal lift-producing force of the aircraft.

4. In an aircraft: a circular wing having a central circular opening therein; the radial cross section of said wing between said opening and the outer periphery of the wing being that of an efficient, lift-producing airfoil having its leading edge at the outer periphery; a duct extending downwardly from said opening; a downwardly thrusting impeller operatively mounted in said duct; a plurality of slots in said duct communicating with the interior of said wing and positioned to induce a pressure drop within the wing under influence of air flow through said impeller; a plurality of intake slots spaced along the outer periphery of said wing to admit air to the interior of the wing, whereby a radially inwardly airflow is induced in said wing; said intake slots and the outer periphery of said wing being dimensioned to occupy only a portion of said leading edge so that the main portion of the radially flowing air is diverted over the upper surface of the wing to provide the principal lift-producing force of the aircraft; and means for tilting said impeller in two directions normal to each other.

5. In an aircraft: a circular wing having a central circular opening therein; the radial cross section of said wing between said opening and the outer periphery of the wing being that of an efficient, lift-producing airfoil having its leading edge at the outer periphery; a duct extending downwardly from said opening; a downwardly thrusting impeller operatively mounted in said duct; a plurality of slots in said duct communicating with the interior of said wing and positioned to induce a pressure drop within the wing under influence of air flow through said impeller; a plurality of intake slots spaced along the outer periphery of said wing to admit air to the interior of the wing, whereby a radially inwardly airflow is induced in said wing; said intake slots and the outer periphery of said wing being dimensioned to occupy only a portion of said leading edge so that the main portion of the radially flowing air is diverted over the upper surface of the wing to provide the principal lift-producing force of the aircraft; said impeller being mounted in a gimbal for pivotal movement about an axis parallel to the longitudinal axis of the aircraft and about a second axis normal to said first mentioned axis; and means for controlled tilting said impeller about said axes selectively.

6. In an aircraft: a circular wing having a central circular opening therein; the radial cross section of said wing between said opening and the outer periphery of the wing being substantially a true airfoil having its leading edge at the outer periphery; a duct extending downwardly from said opening; a downwardly thrusting impeller operatively mounted in said duct; a plurality of slots in said duct communicating with the interior of said wing and positioned to induce a pressure drop within the wing under influence of air flow through said impeller; a plurality of intake slots in the outer periphery of said wing to admit air to the interior of the wing, whereby a radially inwardly airflow is induced in said wing; said intake slots and the outer periphery of said wing being shaped so that portions of the radially flowing air are diverted over the outer surfaces of the wing; and means for tilting said impeller in two directions normal to each other; a pair of opposed control planes spaced above said wing; said control planes extending outwardly and rearwardly from the longitudinal axis of the aircraft forwardly of said opening; and means for pivotally moving portions of said control planes to deflect portions of the airflow over said wing.

7. In an aircraft: a circular wing having a central circular opening therein; the radial cross section of said wing between said opening and the outer periphery of the wing being substantially a true airfoil having its leading edge at the outer periphery; a duct extending downwardly from said opening; a downwardly thrusting impeller operatively mounted in said duct; a plurality of slots in said duct communicating with the interior of said wing and positioned to induce a pressure drop within the wing under influence of air flow through said impeller; a plurality of intake slots in the outer periphery of said wing to admit air to the interior of the wing, whereby a radially inwardly airflow is induced in said wing; said intake slots and the outer periphery of said wing being shaped so that portions of the radially flowing air are diverted over the outer surfaces of the wing; an upright fin on the longitudinal axis of the aircraft forwardly of said opening; a rudder pivotally mounted on said fin; a pair of opposed control planes spaced above said wing; said control planes extending outwardly and rearwardly from the longitudinal axis of the aircraft forwardly of said opening; and means for pivotally moving portions of said control planes to deflect portions of the airflow over said wing.

8. In an aircraft: a circular wing having a central circular opening therein; the radial cross section of said wing between said opening and the outer periphery of the wing being substantially a true airfoil having its leading edge at the outer periphery; a duct extending downwardly from said opening; a downwardly thrusting impeller operatively mounted in said duct; a plurality of slots in said duct communicating with the interior of said wing and positioned to induce a pressure drop within the wing under influence of air flow through said impeller; a plurality of intake slots in the outer periphery of said wing to admit air to the interior of the wing, whereby a radially inwardly airflow is induced in said wing; said intake slots and the outer periphery of said wing being shaped so that portions of the radially flowing air are diverted over the outer surfaces of the wing; a cabin on the forward portion of said wing; an upright fin extending from said cabin; a rudder pivotally mounted on said fin forwardly of said opening; a pair of opposed control planes extending outwardly and rearwardly from said cabin and spaced above said wing; means for pivotally moving portions of said control planes to deflect portions of the airflow over said wing; and means for tilting said impeller in two directions normal to each other.

9. In an aircraft: a circular wing having a central circular opening therein; the radial cross section of said wing between said opening and the outer periphery of the wing being substantially a true airfoil having its leading edge at the outer periphery; a duct extending downwardly from said opening; a downwardly thrusting impeller operatively mounted in said duct; a plurality of slots in said duct communicating with the interior of said wing and positioned to induce a pressure drop within the wing under influence of air flow through said impeller; a plurality of intake slots in the outer periphery of said wing to admit air to the interior of the wing, whereby a radially inwardly airflow is induced in said wing; said intake slots and the outer periphery of said wing being shaped so that portions of the radially flowing air are diverted over the outer surfaces of the wing; a cabin on the forward portion of said wing; an upright fin extending from said cabin; a rudder pivotally mounted on said fin forwardly of said opening; a pair of opposed control planes extending outwardly and rearwardly from said cabin and spaced above said wing; means for pivotally moving portions of said control planes to deflect portions of the airflow over said wing; said impeller being mounted in a gimbal for pivotal movement about an axis parallel to the longitudinal axis of the aircraft and about a second axis normal to said first mentioned axis; and means for controllably tilting said impeller about said axes selectively.

10. In an aircraft: a circular wing having a central circular opening therein; the radial cross section of said wing between said opening and the outer periphery of the wing being substantially a true airfoil having its leading edge at the outer periphery; a duct extending downwardly from said opening; a downwardly thrusting impeller operatively mounted in said duct; a plurality of slots in said duct communicating with the interior of said wing and positioned to induce a pressure drop within the wing under influence of air flow through said impeller; a plurality of intake slots in the outer periphery of said wing to admit air to the interior of the wing, whereby a radially inwardly airflow is induced in said wing; said intake slots and the outer periphery of said wing being shaped so that portions of the radially flowing air are diverted over the outer surfaces of the wing; a cabin on the forward portion of said wing; an upright fin extending from said cabin; a rudder pivotally mounted on said fin forwardly of said opening; a pair of opposed control planes extending outwardly and rearwardly from said cabin and spaced above said wing; means for pivotally moving portions of said control planes to deflect portions of the airflow over said wing; said impeller being mounted in a gimbal for pivotal movement about an axis parallel to the longitudinal axis of the aircraft and about a second axis normal to said first mentioned axis; and means for controllably tilting said impeller about said axes selectively; and rearwardly thrusting propulsive means in the rear portion of said wing.

References Cited in the file of this patent

UNITED STATES PATENTS

| | | |
|---|---|---|
| 1,822,386 | Andersen | Sept. 8, 1931 |
| 2,507,611 | Pappas | May 16, 1950 |
| 2,711,295 | Peterson | June 21, 1955 |
| 2,718,364 | Crabtree | Sept. 20, 1955 |

FOREIGN PATENTS

| | | |
|---|---|---|
| 425,617 | France | Apr. 8, 1911 |